F. CONRAD & Y. SAKAI.
IMPEDANCE DEVICE FOR USE WITH CURRENT RECTIFIERS.
APPLICATION FILED JAN. 10, 1912.
1,075,404.
Patented Oct. 14, 1913.
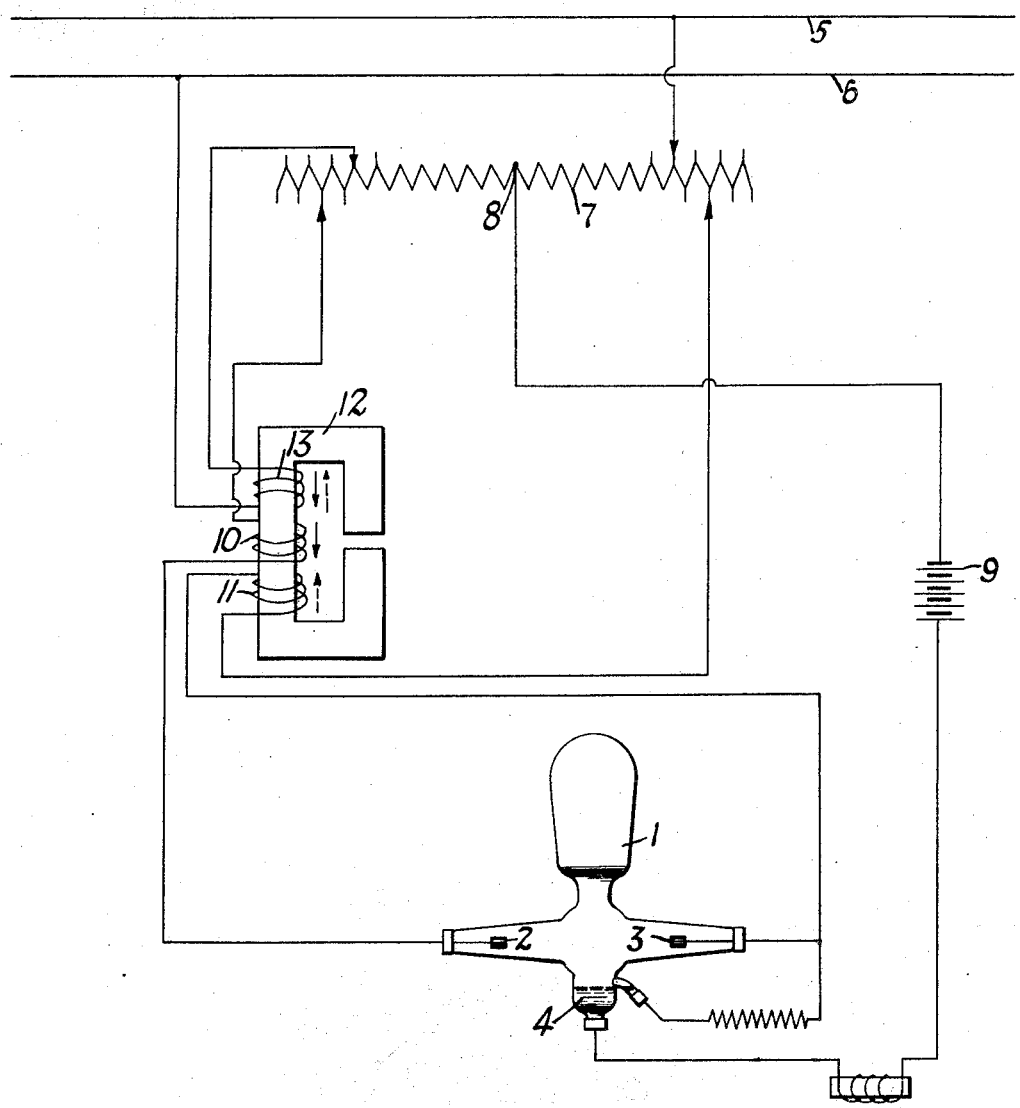
WITNESSES:
INVENTORS
Frank Conrad
& Yasushiro Sakai
BY
ATTORNEY.

UNITED STATES PATENT OFFICE.

FRANK CONRAD, OF SWISSVALE, AND YASUDIRO SAKAI, OF EAST PITTSBURGH, PENNSYLVANIA, ASSIGNORS TO WESTINGHOUSE ELECTRIC AND MANUFACTURING COMPANY, A CORPORATION OF PENNSYLVANIA.

IMPEDANCE DEVICE FOR USE WITH CURRENT-RECTIFIERS.

1,075,404.  Specification of Letters Patent.  Patented Oct. 14, 1913.

Application filed January 10, 1912. Serial No. 670,526.

*To all whom it may concern:*

Be it known that we, FRANK CONRAD, a citizen of the United States, and YASUDIRO SAKAI, a subject of the Emperor of Japan. and residents, respectively, of Swissvale and East Pittsburgh, both in the county of Allegheny and State of Pennsylvania, have invented a new and useful Improvement in Impedance Devices for Use with Current-Rectifiers, of which the following is a specification.

Our invention relates to current-rectifying apparatus, and particularly to such apparatus as is employed for the charging of storage batteries.

The object of our invention is to provide an impedance device for use with a mercury vapor or similar rectifier whereby the rectifier may be caused to automatically charge widely varying numbers of cells of battery without further attention on the part of the operator than a single simple initial adjustment of the voltage applied to the rectifier to obtain the proper value of charging current.

Mercury vapor and other current rectifiers are now commonly employed for charging storage batteries, and, when so employed, impedance devices are usually interposed in their circuits to provide for automatically decreasing the charging current and increasing the voltage applied to the battery as the degree of charge of the battery and its voltage increase. At the start of the charging operation the charging current has its maximum value and causes the drop of voltage in the impedance to be a maximum. As the battery becomes charged, its voltage increases and the charging current decreases. With a reduced current traversing the impedance device, the voltage drop in it diminishes, and the voltage applied to the battery increases accordingly, thereby compensating for the increased battery voltage resulting from a greater degree of charge.

The degree of change in the voltage of a battery during the charging operation depends upon the number of cells of which it is composed; that is, the larger the number of cells the greater will be the voltage change. In order to adapt rectifiers for use with batteries having different numbers of cells, means are usually provided for varying the voltage of the source of supply, but, after the supply voltage is once adjusted to correspond to the number of cells or normal voltage of a battery, it is desirable that the impedance device should automatically provide for and permit of the changes in the battery voltage that occur during charging. That is, the impedance device should automatically regulate the voltage applied to a battery, irrespective of the number of its cells, within a large range, and without the necessity of adjusting the voltage of the source of supply after the initial adjustment thereof.

The amount of voltage drop in impedance devices heretofore constructed, is dependent only upon the amount of current traversing them, and, consequently, the range of voltage variation produced by them with a given change in the current supplied to the battery is always the same, irrespective of the number of cells of battery being charged or of the normal battery voltage. Consequently, in order to adapt rectifying outfits embodying such devices to use with widely varying battery voltages or numbers of cells, it has been necessary to provide means for manually adjusting both the impedance device and the voltage applied to the rectifier, it being requisite, however, that the two adjustments should bear a definite relation to each other; that is, that the applied alternating current voltage should bear some definite relation to the impedance in series with the rectifier. The making of such adjustments is a complicated matter, and, in order that they may be properly effected, it has been customary to provide charts or tables giving the proper combinations under different conditions.

According to the present invention, the impedance is so constructed and connected in the circuits of a rectifier, that it will automatically regulate the voltages applied to batteries having widely varying numbers of cells, it being only necessary to make an initial manual adjustment of the supply voltage. In other words, with the same variation in the amount of the charging current, the amount of change in the voltage applied to the battery will automatically depend upon the number of cells composing it. Rectifying outfits embodying the present device, therefore, require less skilled and constant attention during operation than others heretofore provided.

In the single figure of the accompanying drawing, which diagrammatically illustrates a system embodying our invention, a mercury-vapor or other similar rectifying device 1, having anodes 2 and 3 and a mercury or other suitable vaporizable cathode 4, is supplied with alternating current from a distributing circuit 5—6 through an autotransformer 7, a suitable intermediate point 8 of which is connected to one terminal of a battery 9, the other terminal of which is connected to the cathode of the rectifier. Of course, if desired, a two winding transformer may be employed instead of the autotransformer. The battery 9 may comprise any suitable number of cells, and in order to adjust the direct current voltage of the rectifier to correspond to the number of cells or nominal voltage of the battery, the number of convolutions of the autotransformer winding included in the primary circuit of the secondary circuit, or both, may be adjusted. The anodes of the rectifier are connected to the autotransformer winding at or near its extremities, and included in the said connections are windings 10 and 11, respectively, of an impedance device 12, the core of which is preferably provided with an air gap. The impedance device is provided with a third winding 13 that is included in the primary circuit of the autotransformer by forming a part of the connection between the transformer and the supply circuit. The windings 10 and 11 are traversed by alternate half-waves of the alternating current, and are arranged to produce fluxes in opposite directions in the core 12. The winding 13 is, of course, traversed by both half-waves of the alternating current, and the three windings are so arranged with respect to each other that the fluxes produced by the winding 13 supplement the fluxes produced by the windings 10 and 11, alternately; that is, during the half cycle, when the winding 10 is active, the flux produced by the said winding supplements that produced at the same time by the winding 13, similar conditions existing during the next half cycle, with respect to the fluxes produced by the coils 11 and 13.

In the operation of the system, drops of potential occur in the windings 10 and 11 of the impedance device that are dependent in degree upon the amounts of current traversing the said windings. Since the flux produced by the winding 13 supplements those produced by the windings 10 and 11 alternately, it serves to cause an additional drop in the potential applied to the rectifier, and the amount of the additional drop of potential depends directly upon the amount of primary current in the autotransformer and indirectly upon the amount of current supplied to the battery for charging purposes. At the beginning of the charging operation, when the degree of charge of the battery is low, the amount of current supplied to the battery is at a maximum, and, consequently, the drops of potential in the impedance device due, both to the amount of current traversing the windings 10 and 11 and to the flux produced by the winding 13, are at a maximum. As the battery becomes charged, its voltage increases and the amount of current traversing it gradually decreases, with the result that the drops of potential in the impedance device, due to both causes, are diminished, and the voltage applied to the battery gradually increases to compensate for the gradually increasing opposing voltage of the battery.

If the rectifier is employed for the charging of batteries having different numbers of cells, the voltage applied to the rectifier should be first adjusted to cause the direct current voltage of the rectifier to somewhat exceed the battery voltage, in order that the battery may be caused to charge, and also to cause the rectifier to deliver the desired amount of charging current. The voltage adjustment is preferably effected by varying the number of convolutions in the primary circuit of the autotransformer, though it may also be effected by adjustment of the convolutions in the secondary circuit, or in both. In any case, however, with a constant secondary or charging current and a constant primary voltage, the primary current will vary directly with the number of cells of the battery and the direct current voltage of the rectifier. It is obvious, therefore, that the voltage drop caused by the winding 13 of the impedance device is less with a small number of cells than it is with a larger number, and that, consequently, the variation of voltage applied to the battery, as it becomes charged, will be less for a small number of cells than it is for a larger number. This is a highly advantageous feature of the present invention and permits of the use of the rectifier for charging widely varying numbers of cells of battery without further attention and making an initial adjustment of the voltage until the charging current attains a predetermined or desired value.

We claim as our invention:

1. The combination with current-rectifying apparatus, of an inductive device having two windings respectively traversed by alternate half waves of the alternating current to be rectified and another winding traversed by both half waves of said current, the flux produced by the latter winding alternately supplementing those produced by the other windings.

2. The combination with current-rectifying apparatus, of an inductive device having two windings respectively traversed by alternate half waves of the alternating current to be rectified and another winding traversed by both half waves of said current.

3. The combination with a transformer, and current rectifying apparatus supplied therefrom, of an inductive device having windings respectively included in connections between the transformer and the rectifying apparatus and a winding in the primary circuit of the transformer, the flux produced by the said winding alternately supplementing those produced by the other windings.

4. The combination with a transformer, and current rectifying apparatus supplied therefrom, of an inductive device having windings respectively included in connections between the transformer and the rectifying apparatus and a winding in the primary circuit of the transformer.

5. The combination with current-rectifying apparatus having anodes and a cathode, and a transformer having an intermediate point of its winding connected to the cathode of the rectifying apparatus, and other points connected to its anodes, of an inductive device having windings respectively included in the connections to the anodes and a third winding traversed by the primary current of the transformer, the flux produced by the said winding alternately supplementing those produced by the other two windings.

6. The combination with current-rectifying apparatus having anodes and a cathode, and a transformer having an intermediate point of its winding connected to the cathode of the rectifying apparatus, and other points connected to its anodes, of an inductive device having windings respectively included in the connections to the anodes and a third winding traversed by the primary current of the transformer.

7. The combination with current-rectifying apparatus, and means for adjusting the voltage applied thereto, of an inductive device having two windings respectively traversed by alternate half waves of the alternating current to be rectified, and another winding traversed by both half waves of said current, the flux produced by the latter winding alternately supplementing those produced by the other windings.

8. The combination with current-rectifying apparatus, and means for adjusting the voltage applied thereto, of an inductive device having two windings respectively traversed by alternate half waves of the alternating current to be rectified, and another winding traversed by both half waves of said current.

In testimony whereof, we have hereunto subscribed our names this 23rd day of Dec., 1911.

FRANK CONRAD.
YASUDIRO SAKAI.

Witnesses:
W. L. WRIGHT,
B. B. HINES.